Jan. 28, 1947. H. A. ALTORFER ET AL 2,414,788
TURBINE CONSTRUCTION
Filed Nov. 23, 1942 2 Sheets-Sheet 2

Inventors
H. A. Altorfer
J. A. Johnson
by K. S. Wyman
Attorney

Patented Jan. 28, 1947

2,414,788

UNITED STATES PATENT OFFICE 2,414,788

TURBINE CONSTRUCTION

Hans A. Altorfer and John Algot Johnson, Wauwatosa, Wis., assignors to Allis-Chalmers Manufacturing Company, Milwaukee, Wis., a corporation of Delaware Application November 23, 1942, Serial No. 466,610

22 Claims. (Cl. 60—41)

This invention relates generally to elastic fluid turbines and more particularly to the mounting and cooling of high temperature turbine structures.

The invention is particularly applicable, although in no manner limited, to axial flow combustion gas turbines designed to have a rearwardly directed coaxial exhaust portion surrounding the rear spindle or rotor supporting bearing since in such designs the rear bearing structure is subject to misalinement and/or failure due to overheating and the resultant relative expansion and excessive stressing of the supporting and interconnected parts. In this connection, the aforementioned misalinement and/or failure is in some instances produced, at least in part, by the overheating and deformation of the cylinder or casing structure which carries the rear spindle supporting bearing and encloses the active or blade carrying portion of the spindle.

It is therefore an object of this invention to provide an improved high temperature turbine structure which will eliminate the overheating and the excessive stressing, misalinement and/or failure of the interconnected parts supporting same and/or elements thereof.

Another object of this invention is to provide a compact and durable high temperature turbine structure which is effective to reduce, to safe values, the expansion produced stresses set up therein and which can be readily manufactured and installed with a minimum of time and expense.

In accordance with this invention, one or more of the above stated objects may be accomplished in connection with a turbine cylinder or casing structure having a peripheral portion intermediate its ends mounted on a series of circumferentially spaced supports for radial expansion and contraction relative thereto with the portions of said structure on either side of said peripheral portion substantially free to expand and contract longitudinally with respect to said peripheral portion and with respect to said supports by embodying therein one or more of the following modifications: (1) enclosing the bearing supporting the exhaust end of the spindle in a shell forming with the interior of the exhaust end portion of a said structure an annular rearwardly directed coaxial exhaust gas passage; (2) supporting said shell and the bearing disposed therein on a plurality of hollow radial members which extend through and are secured to the exhaust end portion of said structure; (3) the introduction and withdrawal of lubricant and the introduction of cooling fluid through said members; (4) the provision of a cooling fluid space interposed between and insulating said bearing from the adjacent blade carrying portion of the rotor; (5) the conduction of said cooling fluid through said space and then in a stream surrounding and insulating said bearing from said exhaust gas passage; (6) mounting the bearing rotatably supporting the opposite or inlet end portion of said spindle on radially extending members carried by said supports; and (7) interposing between the inlet portion of the turbine casing and the adjacent bearing supported by the radially extending members mounting same on said fixed supports, shielding and cooling fluid passage and chamber defining means carried by said members. In addition, some of the above stated objects and/or features thereof may be accomplished and/or attained in most any turbine structure, simply by embodying therein certain of the aforementioned modifications.

The invention accordingly consists of the various features of construction, combinations of elements, and arrangements of parts as is more fully set forth in the appended claims and in the detailed description, reference being had to the accompanying drawings, in which:

Figures 1, 2:
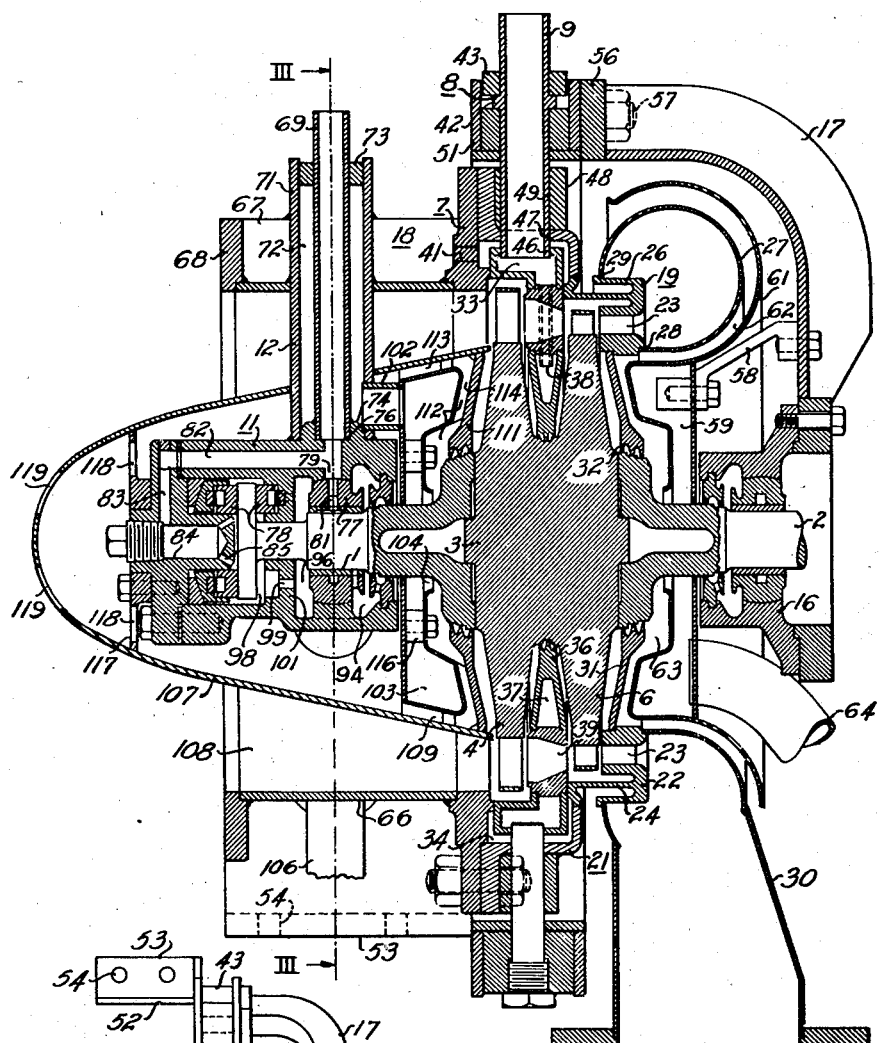
Fig. 1 is a longitudinal section through a turbine structure embodying the invention, taken on line I—I of Fig. 3.
Fig. 2 is a plan view schematically illustrating the supporting structure for the turbine casing and for the bearing rotatably mounting the inlet end of the turbine rotor.
Figure 3:
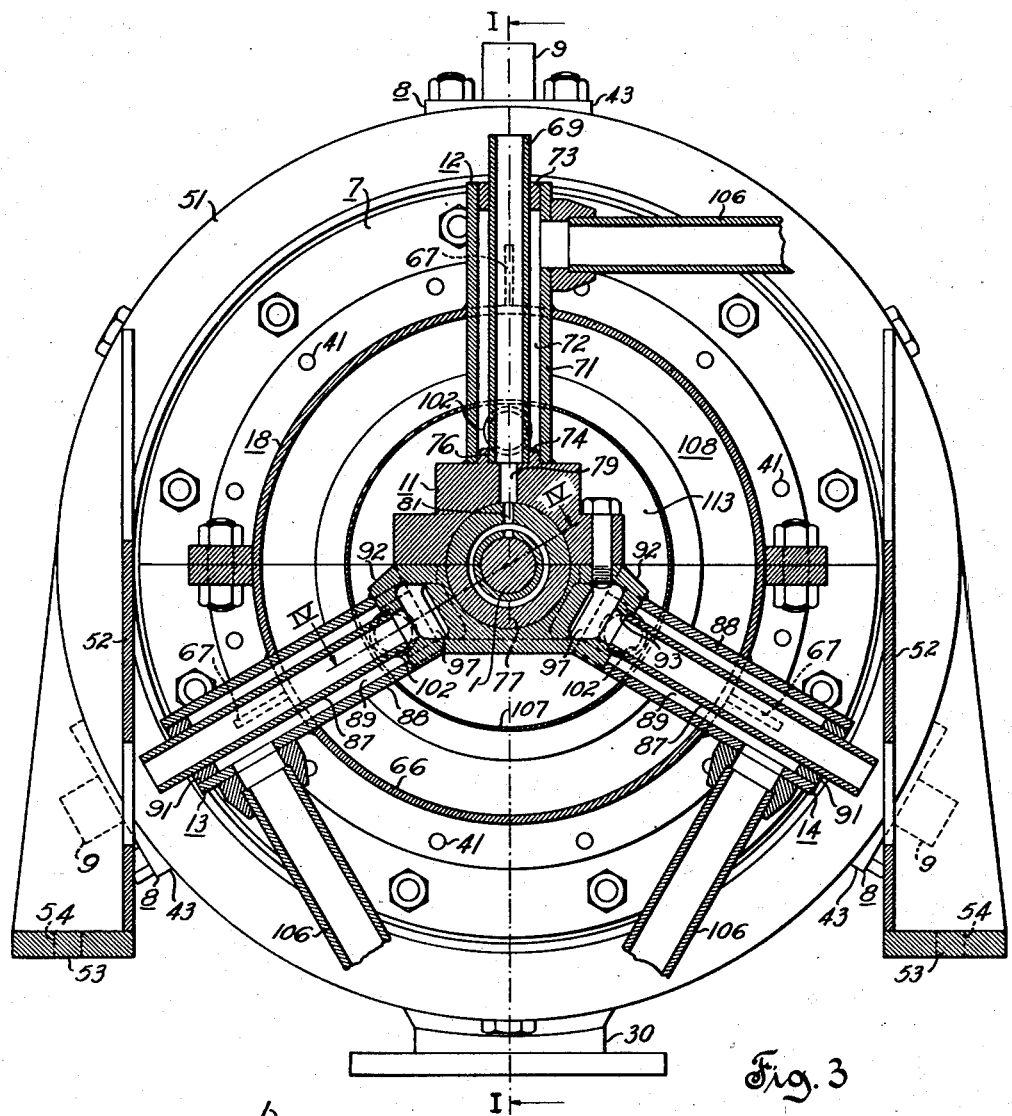
Fig. 3 is a transverse section taken on line III—III of Fig. 1.

Referring to Figs. 1, 2 and 3 of the drawings, it is seen that a turbine structure embodying the invention may include coaxially spaced shaft portions 1 and 2 and an intermediate blade carrying portion 3 presenting axially spaced blade carrying disks 4 and 6, an elongated casing 7 surrounding the shaft portion 1 and the intermediate portion 3 of said rotor, a series of circumferentially spaced, fixed supports 8 surrounding and being spaced from the periphery of an intermediate portion of said casing, a plurality of radially extending members 9 connecting the periphery of said intermediate portion of the casing 7 with the fixed supports 8, a bearing 11 rotatably mounting the shaft portion 1 of said rotor, said bearing being in turn coaxially supported by a plurality of radially extending members 12, 13 and 14 mounted on the adjacent end of the casing 7, and a bearing 16 rotatably supporting the shaft portion 2 of said rotor, said bearing being in turn coaxially supported on a plurality of radially extending members 17 carried by the fixed supports 8. The casing 7 comprises an exhaust portion 18, an inlet portion 19 and an intermediate or main portion 21; said portions being integrally united to form a unitary structure with its inlet and intermediate portions surrounding the blade carrying portion 3 of the rotor and with its exhaust portion surrounding the shaft portion 1 of the rotor and the bearing 11 rotatably supporting same.

The inlet portion 19 of the casing 7 includes a nozzle structure embodying an annular coaxial body portion 22 having one or more nozzle passages 23 extending therethrough and radially flexible inner and outer annular members 24 and 26 projecting from said body portion in coaxial spaced relation with respect to each other and with respect to the nozzle passage containing part of the body portion. The inner member 24, which is of greater axial length than either the member 26 or the nozzle passage containing part of the body portion 22, surrounds the latter and the blade carrying disk portion 6 of the rotor and unites the nozzle structure with the adjacent side of the intermediate casing portion 21 as shown in Fig. 1. The inlet side of the nozzle structure is enclosed by an annular inlet manifold forming member 27 having spaced coaxial edges, one of which, 28, is united with the inner edge of the nozzle body portion 22 and the other of which, 29, is united with the free end portion of the member 26; member 27 may be provided with a suitable motive fluid inlet connection 30. An annular shielding and sealing disk 31 has its outer edge united with the inner periphery of the nozzle passage containing part of the nozzle body adjacent the discharge end of the nozzle passage therein and has its inner edge provided with annular sealing projections 32 which coact with the opposed peripheral portion of the turbine rotor. The previously described construction renders the inlet portion substantially free to expand and contract both radially and longitudinally with respect to the intermediate or main portion 21.

The intermediate portion 21 is fabricated or otherwise formed to provide a hollow structure including inner and outer annular cooling fluid spaces 33 and 34, respectively, and a diaphragm disk member 36 disposed between the rotor blade carrying disks 4 and 6 and having a hollow interior 37 which, with the aid of partitions and ports (not shown) and the ducts 38 extending radially through the fluid turning vane elements 39 embodied in the member 36 and into the space 33 and the hollow interior 37, connects the space 33 in series flow relation with the space 34; the latter in turn communicating with the atmosphere through an annular series of ports 41. The connecting members 9 are preferably formed as tubular cooling fluid conductors having flanged outer ends 42 clamped to the fixed supports 8 by means of cap members 43 and having plain inner ends slidably disposed in radially alined openings 46 and 47 provided in the outer walls of the spaces 33 and 34, respectively. The intermediate portion 21 is also provided on its periphery with additional means slidably receiving and guiding the members 9 through the alined openings 46 and 47; said additional means being in the nature of fabricated bosses 48 each having an opening 49 extending radially therethrough in alinement with the openings 46 and 47. The members 9, the outer ends of which may be connected with a suitable source of cooling fluid (not shown), provide means for introducing cooling fluid into the space 33. However, since the construction of the connecting members 9 as fluid conductors and the manner in which the intermediate portion 21 including the diaphragm disk 36 is constructed and arranged for the circulation of cooling fluid therethrough are fully disclosed in H. A. Altorfer's copending application Ser. No. 467,964, filed December 5, 1942, and since this construction forms no part of this invention, a further description in this connection is deemed unnecessary. The members 9 are connected with the periphery of the intermediate portion 21 for relative sliding radial movement, and it should therefore be obvious that the intermediate portion of the casing is substantially free to expand and contract radially relative to the fixed supports 8 and that the members 9 prevent longitudinal movements of the intermediate portion 21 relative to the fixed supports 8.

The fixed supports 8 are, in this illustration, carried by a channel shaped ring member 51 (see Fig. 2) which is in turn fixedly mounted on a suitable foundation or the like (not shown) by means of depending leg portions 52 and terminal feet or base members 53 having bolt holes 54 extending therethrough for securing the members 53 to the foundation. The channel shaped members 17 mounting the bearing 16 have outer flanged ends 56 which may be removably secured to the side of the ring member 51 adjacent the supports 8 by any suitable means such as bolts 57. The members 17 also have mounted thereon, as by means of brackets 58, means defining an annular cooling fluid chamber 59 interposed between the disk 31 and the bearing 16; said means including an outer annular curved wall portion 61 which extends outwardly in spaced surrounding relation about the inlet manifold 27 and forms therewith a cooling fluid passage 62 communicating at its outer end with the atmosphere and at its inner end with a space or passage 63 formed between the disk 31 and the means defining chamber 59. Passage 63 communicates at its inner end with the inner end of chamber 59 into which cooling fluid from a suitable source (not shown) may be conducted through a pipe 64. This construction effectively shields the supporting members 17 and the bearing 16 from the highly heated intake manifold 27 and from the adjacent highly heated portions of the turbine rotor. In addition, said construction renders the inlet portion 19 of the casing 7 substantially free to expand and contract both radially and longitudinally with respect to the means defining the cooling fluid chamber 59 and including the curved outer wall portion 61 thereof as well as with respect to the intermediate portion 21.

The exhaust portion 18 comprises an annular shell 66 integrally united in coaxial relation with the exhaust side of the intermediate portion 21 and having thereon a series of circumferentially spaced, axially extending strengthening ribs 67 and an outwardly extending annular end strengthening flange 68. The support 12 for the bearing 11 extends outwardly through the ribbed portion of the shell 66 and is formed by spaced inner and outer coaxial tubular fluid conductors 69 and 71 forming therebetween a cooling fluid passage 72, which is sealed at its outer end by an annular spacing and sealing plug member 73 disposed between the conductors 69 and 71; the latter being united with the shell 66 and a rib 67 thereon preferably by welding as shown. The inner ends of conductors 69 and 71 are welded or otherwise secured to the bearing 11 by means of a boss 74 thereon which extends within the inner end of conductor 71 and which has therein a recess 76 receiving the inner end of the conductor 69. Bearing 11 includes main and thrust portions 77 and 78, respectively, and lubricant conducting passages 79, 81, 82, 83, 84 and 85 placing said bearing portions in communication with the recess 76 and conductor 69; the latter extending outwardly beyond the end of conductor 71 for connection with a suitable source of lubricant (not shown).

Figure 4:
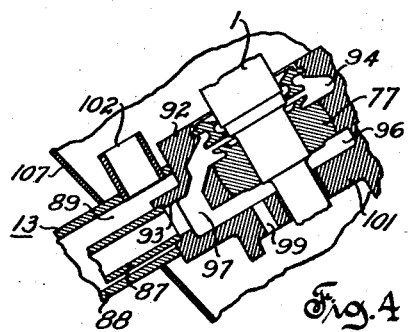
Fig. 4 is a partial section taken on line IV—IV of Fig. 3.

The support 13 for the bearing 11 extends outwardly through the ribbed portion of the shell 66 and is formed, particular attention being directed to Fig. 4, by spaced inner and outer eccentrically disposed tubular fluid conductors 87 and 88 forming therebetween a cooling fluid passage 89 which is sealed at its outer end by a circular sealing and spacing plug member 91. Conductor 88 is united with the shell 66 and with a rib 67 thereon in the manner described with respect to the conductor 71 of support 12. The inner ends of conductors 87 and 88 may be united in any suitable manner with the bearing 11 but preferably by providing a stepped boss 92 thereon which is abutted by the end of conductor 88 and which has in its stepped or outer portion a recess 93 receiving therein the inner end of conductor 87. Lubricant issuing from the main bearing portion 77 enters the axially spaced annular lubricant receiving spaces 94 and 96 and flows outwardly therefrom through a return passage 97 which communicates with the recess 93 and the conductor 87. Lubricant issuing from the thrust bearing portion 78 enters the annular space 98 and then flows through one or more ports 99 provided in a separating wall portion 101 and into the space 96. Conductor 87 extends outwardly beyond the outer end of conductor 88 for connection with a suitable lubricant withdrawing and/or receiving means (not shown).

The construction and function of the supports 13 and 14 for the bearing 11 are identical and since the same numerals are used to designate corresponding parts, a detailed description of support 14 is deemed unnecessary for a complete understanding of the invention; it being sufficient in this connection to point out that the lubricant entering the spaces 94 and 96 from the main and thrust bearing portions passes outwardly therefrom through the two passages 97 and the conductors 87 embodied in the supports 13 and 14. The outer conductors of the supports 12, 13 and 14 each has mounted thereon adjacent its inner end a tubular connector 102 extending coaxially with respect to the shaft portion 1 of the rotor and toward the intermediate blade carrying portion 3 thereof; said connectors collectively supporting means defining an annular coaxial cooling fluid chamber 103 which is spaced from and interposed between the blade carrying portion 3 of the rotor and the adjacent end of the bearing 11. The inner edge of the wall of chamber 103 adjacent the blade carrying rotor portion 3 is radially spaced from the shaft portion 1 to provide therebetween an annular cooling fluid passage 104. Connectors 102 place chamber 103 in communication with the interior of the outer conductors 71 and 88 embodied in the supports 12, 13 and 14 and each conductor 71 and 88 has its outer exposed end portion provided with a laterally extending tubular connector 106 for placing the interior of said conductors in communication with a suitable source of cooling fluid (not shown).

The bearing 11 is preferably enclosed in an annular shell 107 which is united with and carried by the outer conductors 71 and 88 embodied in the supports 12, 13 and 14, said shell forming with the shell 66 an annular coaxial exhaust gas passage 108 receiving the motive fluid issuing from the last row of blades mounted on the rotor disk 4. The inner or rotor end of shell 107 may be stiffened by means of ribs 109 uniting same with the opposed portions of the means defining the chamber 103. The inner end of shell 107 mounts an annular sealing and shielding disk 111 which is spaced from and interposed between the means defining the chamber 103 and the blade carrying rotor disk 4; said disk forming with said chamber defining means an annular cooling fluid passage 112 which communicates at its inner end with the passage 104 and at its outer end with the annular space 113 provided between the inner surface of shell 107 and the bearing 11. Disk 111 may be reinforced by means of ribs 114 connecting same with the adjacent wall portion of the means defining chamber 103 and with the adjacent end of shell 107. The axially spaced wall portions of the means defining chamber 103 may also be reinforced by spacing connections 116. If desired, the axial outer end of the bearing 11 may be connected with the adjacent end of the shell 107 by any suitable mutual reinforcing means such as a disk or plate 117 having openings 118 therein for the passage of cooling fluid therethrough. The adjacent end of the shell 107 is preferably provided with at least two rearwardly directed cooling fluid discharge openings 119.

Cooling fluid entering the outer ends of the conductors 71 and 88 through the connectors 106 flows radially inward toward the bearing 11 through the passages 72 and 89, which surround the inner conductors 69 and 87, thereby cooling same and preventing overheating of the lubricant passing therethrough, and then through the connectors 102, the chamber 103, the passages 104 and 112, the space 113, the openings 118 and to atmosphere through the discharge openings 119. The cooling fluid in chamber 103 and in passage 104 is in direct contact with that part of the shaft portion 1 which extends between the intermediate rotor portion 3 and the bearing 11, thereby effectively cooling said shaft portion and decreasing the heat flow therethrough to the bearing 11. The disk 111 and the means defining the chamber 103 provide axially spaced wall surfaces and interposed cooling fluid spaces effectively shielding the rotor side of the bearing 11 from the highly heated blade carrying disk 4. In addition, the shell 107 shields the bearing 11 from hot exhaust gases issuing from the last row of blades and forms therewith a cooling fluid space or passage 113 which surrounds the bearing 11, thereby enabling the cooling fluid passing therethrough to conduct away from the bearing 11 the heat transmitted through the shell 107. The supports 12, 13 and 14 and the connected portions of the bearing 11 are kept relatively cool by the continual flow of lubricant and cooling fluid therethrough. The bearing 11, the means defining the cooling fluid chamber 103, the shell 107 and the disk 111 are integrally united with and carried by the exhaust portion 18 of the casing 7 for movement therewith relative to the intermediate portion 21 and the fixed supports 8. The exhaust portion 18 including the ports mounted therein is therefore substantially free to expand and contract longitudinally relative to the intermediate portion 21 and relative to the fixed supports 8.

Certain features relating to constructions and arrangements, disclosed but not claimed herein, comprising bearings, and lubricating and/or cooling means therefor, are claimed in the copending application of J. A. Johnson, S. N. 466,549, filed Nov. 23, 1942.

The illustrative construction hereinbefore described provides a compact and durable high temperature turbine structure embodying arrangements of parts and/or combinations of elements correlated to effect a sufficient reduction in the expansion produced stresses set up in interconnected parts to substantially eliminate the damaging deformations and strains attributable to such stresses. The invention is of general application to elastic fluid turbine structures and, although the invention has been illustrated and described as applied to a multistage turbine, it should be understood that it is not desired to limit the invention to the exact details of construction herein shown and described as various modifications within the scope of the appended claims may occur to persons skilled in the art.

It is claimed and desired to secure by Letters Patent:

1. A turbine construction comprising a rotor, a casing surrounding said rotor and including end portions and an intermediate portion integrally united with said end portions, one of said end portions being substantially free for expansion and contraction radially with respect to said intermediate portion and with respect to the other end portion, a series of circumferentially spaced, fixed supports spaced from the periphery of said intermediate portion, means supportingly connecting the periphery of said intermediate portion with said fixed supports for radial expansion and contraction relative thereto with said end portions substantially free for expansion and contraction longitudinally relative to said intermediate portion, a bearing for rotatably supporting the end of the rotor adjacent said one end portion, a plurality of members coaxially supporting said bearing from said fixed supports, means carried by said members and defining a cooling fluid confining space interposed between and shielding said bearing and members from the adjacent end of said rotor and from the said one end portion, another bearing for rotatably supporting the end of the rotor adjacent said other end portion, and a plurality of fluid conductors coaxially supporting said other bearing from said other end portion.

2. A turbine construction comprising a rotor, a casing surrounding said rotor and including end portions and an intermediate portion integrally united with said end portions, one of said end portions being substantially free for expansion and contraction radially with respect to said intermediate portion and with respect to the other end portion, a series of circumferentially spaced, fixed supports spaced from the periphery of said intermediate portion, means supportingly connecting the periphery of said intermediate portion with said fixed supports for radial expansion and contraction relative thereto with said end portions substantially free for expansion and contraction longitudinally relative to said intermediate portion, a bearing for rotatably supporting the end of the rotor adjacent said one end portion, a plurality of members coaxially supporting said bearing from said fixed supports, another bearing for rotatably supporting the end of the rotor adjacent said other end portion, and a plurality of members coaxially supporting said other bearing from said other end portion.

3. A turbine construction comprising a rotor, a casing surrounding said rotor, a series of circumferentially spaced, fixed supports surrounding and being spaced from the periphery of an intermediate portion of said casing, means supportingly connecting the periphery of said intermediate portion with said supports for radial expansion and contraction relative thereto with the portions of said casing on either side of said intermediate portion substantially free for expansion and contraction longitudinally with respect to said intermediate portion and with respect to said supports, a bearing for rotatably mounting one end of said rotor, a plurality of members coaxially supporting said bearing from the adjacent end of said casing, another bearing for rotatably mounting the other end of said rotor, and a plurality of members coaxially supporting said other bearing from said fixed supports.

4. In a turbine comprising a rotor enclosed in a casing having an intermediate portion secured to fixed supports and presenting end portions substantially free for expansion and contraction longitudinally with respect to said intermediate portion and with respect to said supports, a bearing for rotatably supporting one end of said rotor, a plurality of members coaxially supporting said bearing from the adjacent end of said casing, another bearing for rotatably supporting the other end of said rotor, and a plurality of members coaxially supporting said other bearing from said fixed supports.

5. In a turbine comprising a rotor enclosed in a casing having a portion secured to fixed supports and presenting a coaxially extending end portion substantially free for expansion and contraction longitudinally with respect to the portion secured to said supports, a bearing for rotatably supporting the end of the rotor adjacent to said one end of the casing, a plurality of members coaxially supporting said bearing from said one end of the casing, another bearing for rotatably supporting the other end of said rotor, and a plurality of members coaxially supporting said other bearing from said fixed supports.

6. A turbine construction comprising a rotor, a casing surrounding the blade carrying portion of said rotor and including a main portion and an end portion integrally united with said main portion for radial expansion and contraction relative thereto, a series of circumferentially spaced, fixed supports spaced from the periphery of said main portion, means supportingly connecting the periphery of said main portion with said fixed supports for radial expansion and contraction relative thereto with said end portion substantially free for expansion and contraction longitudinally relative to said main portion, a bearing for rotatably supporting the end of the rotor adjacent said end portion of said casing, a plurality of members coaxially supporting said bearing from said fixed supports, and means carried by said members and defining a cooling fluid confining space interposed between and shielding said bearing and members from the adjacent end of said rotor and from said end portion.

7. A turbine construction comprising a rotor, a casing surrounding the blade carrying portion of said rotor and including a main portion and an end portion integrally united with said main portion for radial expansion and contraction relative thereto, a series of circumferentially spaced, fixed supports spaced from the periphery of said main portion, means supportingly connecting the periphery of said main portion with said fixed supports for radial expansion and contraction relative thereto with said end portion substantially free for expansion and contraction longitudinally relative to said main portion, a bearing for rotatably supporting the end of the rotor adjacent said end portion of said casing, and a plurality of members coaxially supporting said bearing from said fixed supports.

8. A turbine construction comprising a rotor, a casing surrounding the blade carrying portion of said rotor, a series of circumferentially spaced, fixed supports surrounding a peripheral portion of said casing spaced from one end thereof, means supportingly connecting said peripheral portion with said fixed supports for radial expansion and contraction relative thereto with said one end substantially free for expansion and contraction longitudinally relative to said peripheral portion, a bearing for rotatably supporting the end of the rotor adjacent said one end of said casing, and a plurality of members coaxially supporting said bearing from said fixed supports.

9. A turbine construction comprising a rotor, a casing surrounding said rotor and including a jacketed intermediate portion providing cooling fluid confining spaces surrounding a blade carrying portion of said rotor and end portions integrally united with said intermediate portion, a plurality of fixed supports spaced from the periphery of said intermediate portion, cooling fluid conductors communicating with said spaces and supportingly connecting peripheral parts of said intermediate portion with said fixed supports for radial expansion and contraction relative thereto with said end portions substantially free for expansion and contraction longitudinally relative to said intermediate portion, a bearing for rotatably supporting the end of said rotor adjacent one of said end portions, a plurality of members coaxially supporting said bearing from said fixed supports, another bearing for rotatably supporting the other end of said rotor, a plurality of cooling fluid conductors coaxially supporting said other bearing from the other of said end portions of the casing, and means carried by said conductors and defining a cooling fluid passage which communicates with said conductors and which are interposed between and shield said other bearing from the adjacent end of said rotor and from said other end portion.

10. A turbine construction comprising a rotor, a casing surrounding said rotor and including a jacketed intermediate portion providing cooling fluid confining spaces surrounding a blade carrying portion of said rotor and end portions integrally united with said intermediate portion, a plurality of fixed supports spaced from the periphery of said intermediate portion, cooling fluid conductors communicating with said spaces and supportingly connecting peripheral parts of said intermediate portion with said fixed supports for radial expansion and contraction relative thereto with said end portions substantially free for expansion and contraction longitudinally relative to said intermediate portion, a bearing for rotatably supporting the end of said rotor adjacent one of said end portions, a plurality of members coaxially supporting said bearing from said fixed supports, another bearing for rotatably supporting the other end of said rotor, and a plurality of lubricant conductors communicating with and coaxially supporting said other bearing from the other of said end portions of the casing.

11. A turbine construction comprising a rotor, a casing surrounding said rotor and including end portions and an intermediate portion integrally united with said end portions, one of said end portions being substantially free for expansion and contraction radially with respect to said intermediate portion, a plurality of fixed supports spaced from the periphery of said intermediate portion, cooling fluid conductors communicating with said spaces and supportingly connecting peripheral parts of said intermediate portion with said fixed supports for radial expansion and contraction relative thereto with said end portions substantially free for expansion and contraction longitudinally relative to said intermediate portion, a bearing for rotatably supporting the end of said rotor adjacent one of said end portions, a plurality of members coaxially supporting said bearing from said fixed supports, means carried by said members and defining cooling fluid confining passages interposed between and shielding said bearing and members from the adjacent end of said rotor and from said one end portion of the casing, another bearing for rotatably supporting the other end of said rotor, a plurality of cooling fluid conductors coaxially supporting said other bearing from the other of said end portions of the casing, and means carried by said conductors and defining a cooling fluid passage which communicates with said conductors and which are interposed between and shield said other bearing from the adjacent end of said rotor and from said other end portion.

12. A turbine construction comprising a rotor, a casing surrounding said rotor and including end portions and an intermediate portion integrally united with said end portions, one of said end portions being substantially free for expansion and contraction radially with respect to said intermediate portion, a plurality of fixed supports spaced from the periphery of said intermediate portion, means supportingly connecting peripheral parts of said intermediate portion with said fixed supports for radial expansion and contraction relative thereto with said end portions substantially free for expansion and contraction longitudinally relative to said intermediate portion, a bearing for rotatably supporting the end of said rotor adjacent one of said end portions, a plurality of members coaxially supporting said bearing from said fixed supports, means carried by said members and defining cooling fluid confining passages interposed between and shielding said bearing and members from the adjacent end of said rotor and from said one end portion of the casing, another bearing for rotatably supporting the other end of said rotor, a plurality of elements coaxially supporting said other bearing from the other of said end portions of the casing, and means carried by said elements and defining a cooling fluid passage interposed between and shielding said other bearing from the adjacent end of said rotor and from said other end portion.

13. A turbine construction comprising a rotor, a casing surrounding the blade carrying portion of said rotor, at least three circumferentially spaced, fixed supports surrounding a peripheral portion of said casing remote from one end thereof, means supportingly connecting said peripheral portion with said fixed supports for radial expansion and contraction relative thereto with said one end substantially free for expansion and contraction longitudinally relative to said peripheral portion, a bearing rotatably supporting the end of the rotor adjacent said one end of the casing, and a support for said bearing including spaced, inwardly extending members carried by said one end of the casing.

14. A turbine construction comprising a rotor, a casing surrounding the blade carrying portion of said rotor, a plurality of circumferentially spaced, fixed supports surrounding a peripheral portion of said casing spaced from one end thereof, means supportingly connecting said peripheral portion with said fixed supports for radial expansion and contraction relative thereto with said one end substantially free for expansion and contraction longitudinally relative to said peripheral portion, a bearing rotatably supporting the end of the rotor adjacent said one end of the casing, a support for said bearing including spaced, inwardly extending members carried by said one end of the casing, and means carried by said members and defining a cooling fluid passage interposed between and shielding said bearing from the adjacent end of said rotor.

15. A turbine construction comprising a rotor, a casing surrounding the blade carrying portion of said rotor, a plurality of circumferentially spaced, fixed supports surrounding a peripheral portion of said casing spaced from one end thereof, means supportingly connecting said peripheral portion with said fixed supports for radial expansion and contraction relative thereto with said one end substantially free for expansion and contraction longitudinally relative to said peripheral portion, a bearing rotatably supporting the end of the rotor adjacent said one end of the casing, a support for said bearing including spaced, inwardly extending members carried by said fixed supports, and means carried by said members and defining a cooling fluid passage interposed between and shielding said bearing and members from the adjacent end of said rotor and from said one end of the casing.

16. A turbine construction comprising a rotor, a casing surrounding said rotor and including end portions and an intermediate portion integrally united with said end portions, one of said end portions being substantially free for expansion and contraction radially with respect to said intermediate portion, fixed supporting means disposed adjacent the periphery of said intermediate portion, means supportingly connecting said intermediate portion with said fixed supporting means for radial expansion and contraction relative thereto with said end portions substantially free for expansion and contraction longitudinally relative to said intermediate portion, a bearing for rotatably supporting the end of said rotor adjacent one of said end portions, a support for said bearing including spaced, inwardly extending members carried by said fixed supporting means, means carried by said members and defining a cooling fluid confining passage interposed between and shielding said bearing and members from the adjacent end of said rotor and from said one end portion of the casing, another bearing for rotatably supporting the other end of said rotor, a support for said other bearing including spaced, inwardly extending elements carried by the other of said end portions of the casing, and means carried by said elements and defining a cooling fluid passage interposed between and shielding said other bearing from the adjacent end of said rotor and from said other end portion.

17. A turbine construction comprising a rotor, a casing surrounding said rotor and including end portions and an intermediate portion integrally united with said end portions, one of said end portions being substantially free for expansion and contraction radially with respect to said intermediate portion, fixed supporting means disposed adjacent the periphery of said intermediate portion, means supportingly connecting said intermediate portion with said fixed supporting means for radial expansion and contraction relative thereto with said end portions substantially free for expansion and contraction longitudinally relative to said intermediate portion, a bearing for rotatably supporting the end of said rotor adjacent one of said end portions, a support for said bearing including spaced, inwardly extending members carried by said fixed supporting means, means carried by said members and defining a cooling fluid confining passage interposed between and shielding said bearing from the adjacent end of said rotor, another bearing for rotatably supporting the other end of said rotor, a support for said other bearing including spaced, inwardly extending elements carried by the other of said end portions of the casing, and means carried by said elements and defining a cooling fluid passage interposed between and shielding said other bearing from the adjacent end of said rotor and from said other end portion.

18. A turbine construction comprising a rotor, a casing including a main portion surrounding the blade carrying portion of said rotor and an end portion integrally united with said main portion, fixed supporting means disposed adjacent said main portion, a plurality of radially extending members mounting said main portion on said supporting means in a manner rendering said main portion movable radially and immovable longitudinally relative to said supporting means with said end portion substantially free to expand and contract longitudinally relative to said main portion, a bearing rotatably supporting the end of the rotor adjacent said end portion of the casing, and a support for said bearing including spaced, inwardly extending members carried by said end portion of the casing.

19. A turbine construction comprising a rotor, a casing including a main portion surrounding the blade carrying portion of said rotor and an end portion integrally united with said main portion, fixed supporting means disposed adjacent said main portion, a plurality of radially extending, symmetrically arranged members mounting said main portion on said supporting means in a manner rendering said main portion movable radially and immovable longitudinally relative to said supporting means with said end portion substantially free to expand and contract longitudinally relative to said main portion, a bearing rotatably supporting the end of the rotor adjacent said end portion of the casing, a support for said bearing including spaced, inwardly extending members carried by said fixed supporting means.

20. A turbine construction comprising a rotor, a casing including a main portion surrounding the blade carrying portion of said rotor and an end portion integrally united with said main portion, fixed supporting means disposed adjacent said main portion, means mounting said main portion on said supporting means in a manner rendering said main portion movable radially and immovable longitudinally relative to said supporting means with said end portion substantially free to expand and contract longitudinally relative to said main portion, a bearing rotatably supporting the end of the rotor adjacent said end portion of the casing, a support for said bearing including spaced, inwardly extending members carried by said end portion of the casing, and means carried by said members and defining a cooling fluid passage interposed between and shielding said bearing from the adjacent end of said rotor.

21. A turbine construction comprising a rotor, a casing including a main portion surrounding the blade carrying portion of said rotor and an end portion integrally united with said main portion, fixed supporting means disposed adjacent said main portion, means mounting said main portion on said supporting means in a manner rendering said main portion movable radially and immovable longitudinally relative to said supporting means with said end portion substantially free to expand and contract longitudinally relative to said main portion, a bearing rotatably supporting the end of the rotor adjacent said end portion of the casing, a support for said bearing including spaced, inwardly extending members carried by said fixed supporting means, and means carried by said members and defining a cooling fluid passage interposed between and shielding said bearing and members from the adjacent end of said rotor and from the said end portion of the casing.

22. A turbine construction comprising a rotor, a bearing for rotatably supporting one end of said rotor, a casing surrounding said bearing and the blade carrying portion of said rotor, a circumferential series of fixed supports spacedly surrounding a peripheral portion of said casing remote from the bearing enclosing end thereof, means supportingly connecting said peripheral portion with said fixed supports for radial expansion and contraction relative thereto with the bearing end of said casing substantially free for expansion and contraction longitudinally relative to said peripheral portion, and a support for said bearing including spaced, inwardly extending members carried by the bearing end of said casing.

HANS A. ALTORFER.
JOHN ALGOT JOHNSON.